(12) United States Patent  
Marsh

(10) Patent No.: US 9,282,287 B1  
(45) Date of Patent: Mar. 8, 2016

(54) REAL-TIME VIDEO TRANSFORMATIONS IN VIDEO CONFERENCES

(71) Applicant: Google Inc., Mountain View, CA (US)

(72) Inventor: Brian David Marsh, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/481,079

(22) Filed: Sep. 9, 2014

(51) Int. Cl.
*H04N 7/15* (2006.01)

(52) U.S. Cl.
CPC ........................................ *H04N 7/15* (2013.01)

(58) Field of Classification Search
CPC ......... H04N 7/15; H04N 7/152; H04N 7/147; H04N 7/14; H04N 21/4788; H04N 21/47205
USPC ............. 348/14.01–14.16; 382/103, 117–118
See application file for complete search history.

(56) References Cited

U.S. PATENT DOCUMENTS

| | | | |
|---|---|---|---|
| 6,950,130 B1 | 9/2005 | Qian | |
| 8,339,418 B1 | 12/2012 | Nesmith | |
| 8,373,799 B2 | 2/2013 | Reponen et al. | |
| 8,619,116 B2 | 12/2013 | Pennington et al. | |
| 8,766,983 B2 | 7/2014 | Marks et al. | |
| 2004/0012613 A1* | 1/2004 | Rast | G11B 27/105 345/632 |
| 2011/0008017 A1 | 1/2011 | Gausereide | |
| 2011/0249074 A1* | 10/2011 | Cranfill | H04N 7/147 348/14.02 |
| 2012/0327172 A1 | 12/2012 | El-Saban et al. | |
| 2013/0106904 A1 | 5/2013 | Park et al. | |
| 2013/0342629 A1 | 12/2013 | North et al. | |

OTHER PUBLICATIONS

International Search Report and the Written Opinion of the International Searching Authority, or the Declaration, mailed Sep. 15, 2015, 8 pages.

* cited by examiner

*Primary Examiner* — Melur Ramakrishnaiah
(74) *Attorney, Agent, or Firm* — Lowenstein Sandler LLP

(57) ABSTRACT

Systems and methods are disclosed for real-time video transformations in video conferences. A method includes receiving, by a processing device, a request from a first participant of a video conference to modify a video stream. The method further includes identifying, by the processing device, a foreground and a background within the video stream. The method further includes generating, by the processing device, a modified video stream including a video or image inserted into the background.

20 Claims, 10 Drawing Sheets

400

```
                    ┌─────────┐
                    │  Start  │
                    └────┬────┘
                         ▼
┌──────────────────────────────────────────────────────────────┐
│ RECEIVE A SELECTION OF A VIDEO OR IMAGE FROM A FIRST         │
│ PARTICIPANT OF A VIDEO CONFERENCE                            │
│                                                          410 │
└──────────────────────────┬───────────────────────────────────┘
                           ▼
┌──────────────────────────────────────────────────────────────┐
│ RECEIVE A REQUEST FROM THE FIRST PARTICIPANT OF THE VIDEO    │
│ CONFERENCE TO MODIFY A VIDEO STREAM                          │
│                                                          420 │
└──────────────────────────┬───────────────────────────────────┘
                           ▼
┌──────────────────────────────────────────────────────────────┐
│ IDENTIFY A FOREGROUND AND A BACKGROUND WITHIN THE VIDEO      │
│ STREAM                                                       │
│                                                          430 │
└──────────────────────────┬───────────────────────────────────┘
                           ▼
┌──────────────────────────────────────────────────────────────┐
│ GENERATE A MODIFIED VIDEO STREAM THAT INCLUDES THE VIDEO OR  │
│ IMAGE INSERTED INTO THE BACKGROUND                           │
│                                                          440 │
└──────────────────────────┬───────────────────────────────────┘
                           ▼
┌──────────────────────────────────────────────────────────────┐
│ TRANSMIT THE MODIFIED VIDEO STREAM TO ONE OR MORE CLIENT     │
│ DEVICES OF ADDITIONAL PARTICIPANTS OF THE VIDEO CONFERENCE   │
│                                                          450 │
└──────────────────────────┬───────────────────────────────────┘
                           ▼
                    ┌─────────┐
                    │   End   │
                    └─────────┘
```

FIG. 4

REAL-TIME VIDEO TRANSFORMATIONS IN VIDEO CONFERENCES

TECHNICAL FIELD

This disclosure relates to the field of video conferencing, in particular, to real-time video transformations in video conferences.

BACKGROUND

Video collaborations over the Internet (e.g., video conferences, telemedicine, etc.) are becoming increasingly common as broadband access and applications that take advantage of broadband connectivity proliferate. Applications for supporting video collaborations may be browser-based, or may run independently of a browser.

SUMMARY

The following presents a simplified summary of various aspects of this disclosure in order to provide a basic understanding of such aspects. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the present disclosure, a method includes receiving, by a processing device, a request from a first participant of a video conference to modify a video stream. The method further includes identifying, by the processing device, a foreground and a background within the video stream. The method further includes generating, by the processing device, a modified video stream including a video or image inserted into the background, in which the video or image, when displayed, appears behind the foreground.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings, in which:

FIG. 4 is a flow diagram illustrating a method for transforming a video stream of a video conference in accordance with an implementation of the disclosure;

DETAILED DESCRIPTION

Aspects and implementations of the present disclosure are directed to applying transformations in real-time to video streams. The systems and methods disclosed can be applied to media collaborations (e.g., audio and/or video conferences, audio and/or video chat, audio and/or video conference rooms, audio and/or video chat rooms, etc.) in which content/media streams (e.g., live audio and/or video content, recorded audio and/or video content, etc.) that are transmitted by devices of one or more participants/users are combined into a composite content/media stream. Existing video conference technologies enable participants to view the video streams provided by other participants in the video conference, and such streams are often arranged (e.g., within a single interface) such that a single user (e.g., the primary presenter or current speaker) is allocated a relatively larger or more prominent portion of the interface.

Described herein in various implementations are technologies that allow one or more participants of a media collaboration to request to have video streams associated with the participants transformed in-real time. For example, as described herein, during the course of a video conference, a request to insert an image or video into a background of a video stream (a video stream of the requester and/or a video stream of a different participant) is received. The inserted image or video may appear in the background (e.g., behind a participant), in the foreground (e.g., next to or in front of the participant), or both. A modified video stream may be generated (e.g., by a content processing server, a conference server, and/or locally on a client device participating in the video conference), and transmitted to each participant of the video conference in order to produce an aesthetically appealing and/or humorous effect during the video conference.

Figure 1:
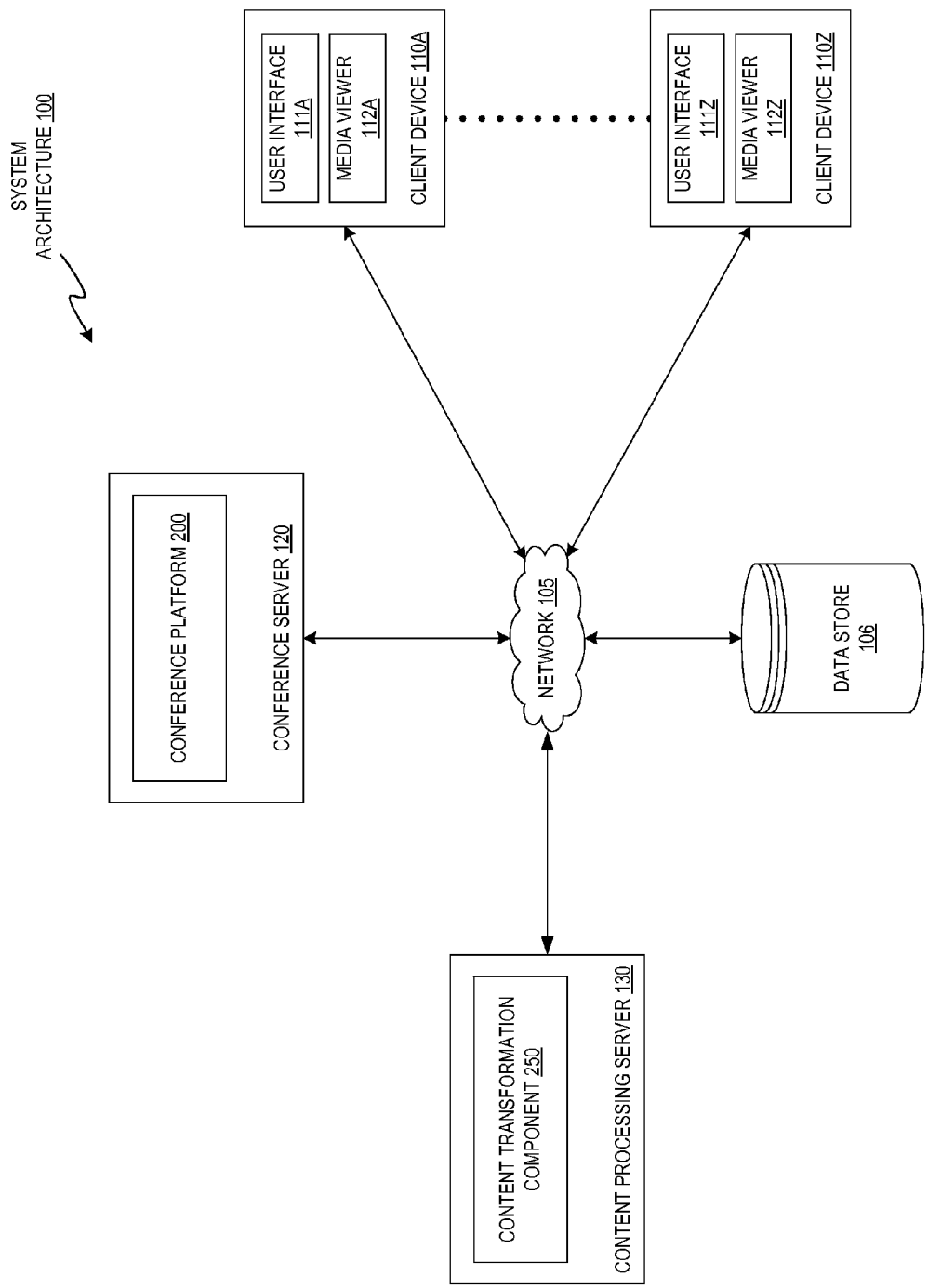
FIG. 1 illustrates an example system architecture in accordance with an implementation of the disclosure.

FIG. 1 illustrates an example system architecture 100, in accordance with an implementation of the disclosure. The system architecture 100 includes client devices 110A-110Z, a network 105, a data store 106, a conference server 120, and a content processing server 130. Each of the various devices of the system architecture 100 may be connected to one another via the network 105. In one implementation, the network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In some implementations, the data store 106 may be cloud-based. One or more of the devices of system architecture 100 may utilize the data store 106 to store public and private data, and data store 106 may be configured to provide secure storage for private data. The data store 106 may be part of or distributed between any of the client devices 110A-110Z, the conference server 120, and the content processing server 130.

In one implementation, the client devices 110A-110Z may include one or more computing devices such as personal computers (PCs), laptops, mobile phones, smart phones, tablet computers, netbook computers etc. Client devices 110A-110Z may also be referred to as "user devices" or "mobile devices". An individual user may be associated with (e.g., own and/or use) one or more client devices (e.g., one or more of client devices 110A-110Z). Client devices 110A-110Z may each be owned and utilized by different users at different geographical locations. Users that participate in video collaborations (e.g., video conferences) may be referred to herein as "conference participants".

The client devices 110A-110Z may each implement the user interfaces 111A-111Z, respectively. Each of user interfaces 111A-111Z may allow a user of the respective client device 110A-110Z to send and receive information to one or more of the conference server 120 and the content processing server 130. For example, one or more of the user interfaces 111A-111Z may be a web browser interface that can access, retrieve, present, and/or navigate content (e.g., web pages such as Hyper Text Markup Language (HTML) pages) provided by the conference server 120. In one implementation, one or more of the user interfaces 111A-111Z may be a standalone application (e.g., a mobile app, conferencing software, etc.), that allows a user of a respective client device 110A-110Z to send and receive information to the conference server 120 and/or the content processing server 130. In one implementation, one or more of the user interfaces 111A-111Z may be conference interfaces that allow conference participants to engage in one or more of video conferencing, audio conferencing, chatting, and or instant messaging. An example user interface (e.g., a graphical user interface window) is described in greater detail with respect to FIG. 3.

Each client device 110A-110Z further includes a media viewer 112A-112Z, respectively. In one implementation, the media viewers 112A-112Z may be applications that allow users to view content, such as images, videos, web pages, documents, etc. For example, the media viewer 112A may be a web browser that can access, retrieve, present, and/or navigate content (e.g., web pages such as Hyper Text Markup Language (HTML) pages, digital media items, etc.) served by a web server. The media viewer 112A may render, display, and/or present the content to a user. The media viewer 112A may also display an embedded media player that is embedded in a web page (e.g., a web page that may provide information about a product sold by an online merchant). In another example, the media viewer 112A may be a standalone application (e.g., a mobile app) that allows users to view digital media items (e.g., digital videos, digital images, electronic books, etc.). In one implementation, media viewers 112A-112Z may further allow for video to be received from one or more sources and displayed within the respective user interfaces 111A-111Z. For example, client device 110A may receive video data from the conference server 120, which may correspond to video streams generated by one or more additional client devices. The media viewer 112A may generate for display (e.g., within the user interface 111A) video corresponding to each of the video streams based on the received video data.

In one implementation, the conference server 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, hardware components, or combinations thereof that may be suitable for implementing the various features described herein. In some implementations, the conference server 120 can enable media collaboration services such as audio and/or video conferences (e.g., among users of client devices 110A-110Z) using, for example, streaming video or voice over IP (VoIP) technologies and may be used for personal, entertainment, business, educational or academically-oriented interactions. The conference server 120 may be dedicated to providing video conferencing services or may provide video conferencing services along with other services including, for example, news services, social networking services and/or content hosting services.

Figure 2:
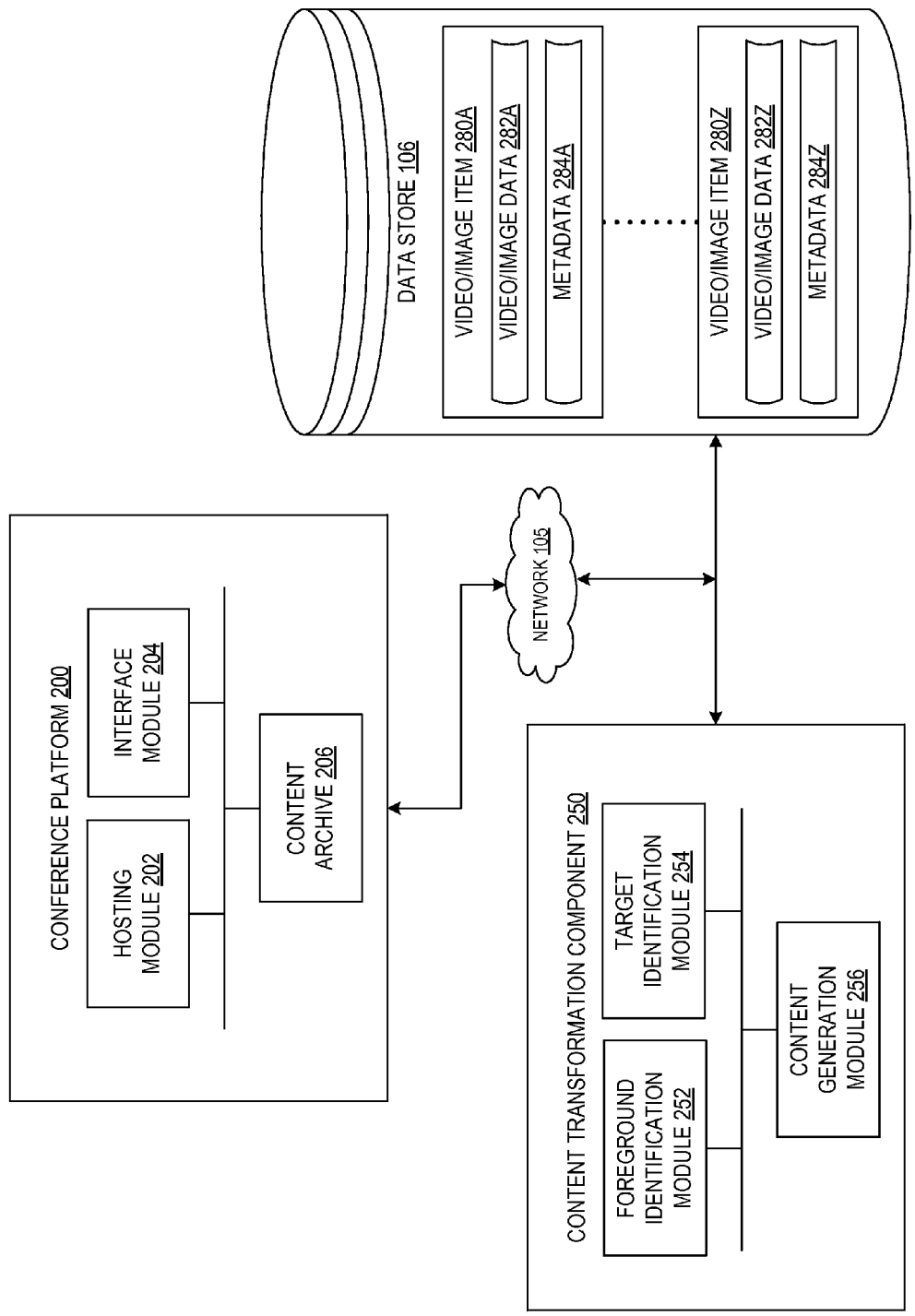
FIG. 2 is a block diagram illustrating a conference platform and a video transformation component in accordance with an implementation of the disclosure.

In one implementation, the conference server 120 includes a conference platform 200. The conference platform 200, as illustrated in FIG. 2, includes a hosting module 202, an interface module 204, and a content archive 206. More or less components may be included in the conference platform 200 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the hosting module 202 may be utilized by the conference platform 200 to initiate and support media collaborations, such as audio/video conferences, chat rooms, video chats, etc. For example, the hosting module 202 may receive requests from users to create media collaboration sessions, may allow users to join pre-existing media collaboration sessions upon receiving requests from the users, may facilitate transmitting invitations to users that permit the users to join pre-existing media collaboration sessions, etc.

Figure 5:
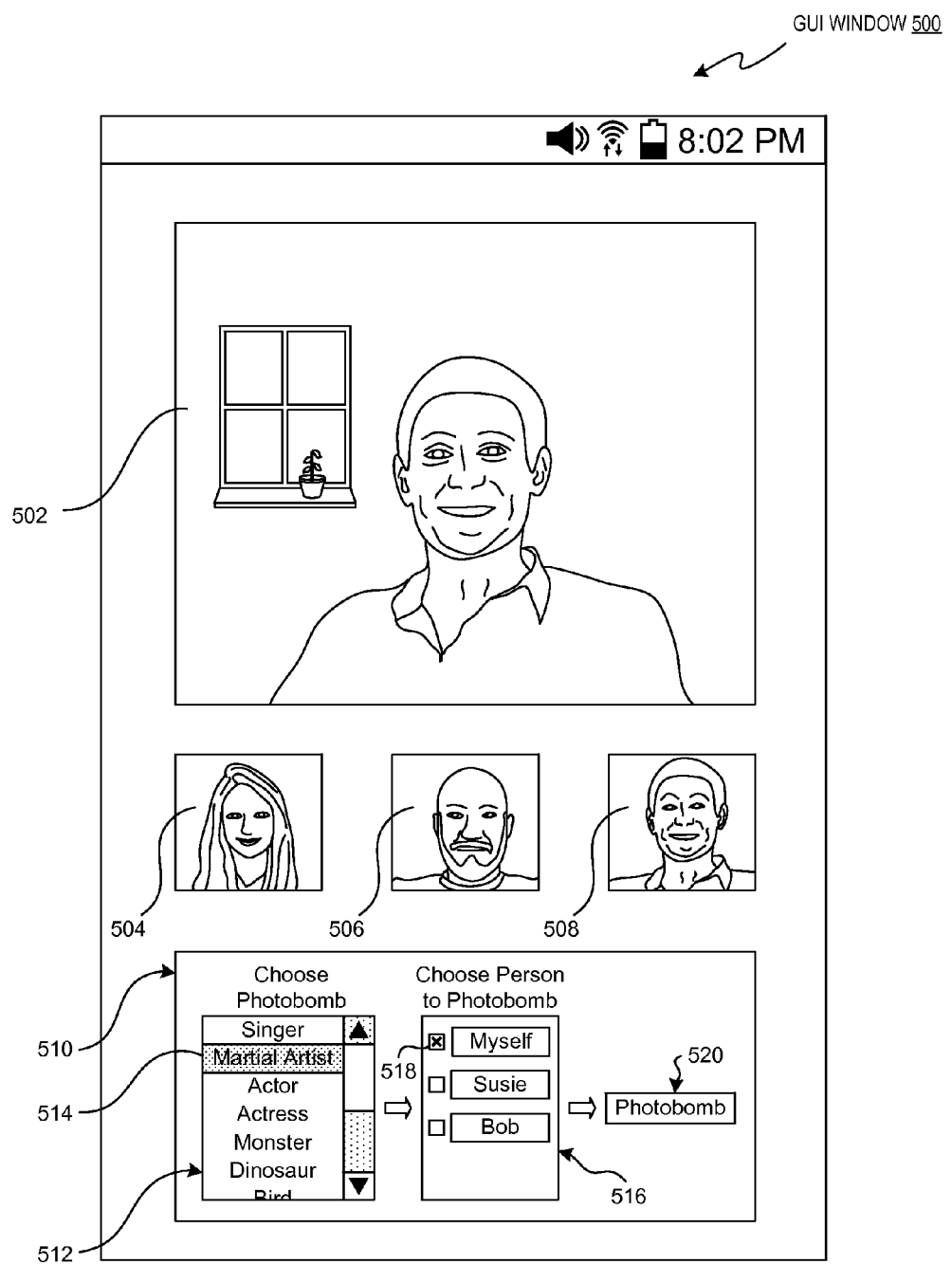
FIG. 5 is a diagram illustrating a media collaboration interface in accordance with an implementation of the disclosure.

In one implementation, the interface module 204 may be utilized by the conference platform 200 to receive multiple audio and/or video streams from one or more of the client devices 110A-110Z of various participants, and generate a composite stream that may include data associated with each of the received streams. The composite stream may then be provided to the one or more client devices 110A-110Z of the various participants in a media collaboration session (e.g., a video conference). In some implementations, the composite stream may include formatting data that can be used by the client devices 110A-110Z for extracting individual video streams and arranging the video streams for presentation by respective user interfaces 111A-111Z. Accordingly, each user/participant of a video conference can simultaneously view some or all of the content streams within a single interface/screen, as illustrated in FIGS. 5 and 8.

In some implementations, one or more participants in a media collaboration hosted by the conference platform 200 may provide/project audio content (e.g., a spoken voice of a participant, music, etc.) which, upon being received/perceived by a client device (e.g., one of client devices 110A-110Z), can be transmitted or otherwise provided by the client device as an audio stream that can be incorporated into the media collaboration. In some implementations, such audio streams can be provided independent of a video stream (e.g., a participant providing audio-only input during a media collaboration), while in other implementations such audio streams can be provided in conjunction with a video stream (e.g., a combined stream, incorporating synchronized video and audio of a participant speaking).

In one implementation, the content archive 206 may be utilized by the conference platform 200 to store media collaboration data (e.g., store video and/or audio stream data, chat data, etc.), which may be accessible by one or more participants via their respective client devices at a later time. In some implementations, the content archive may be combined with the data store 106.

In one implementation, the content processing server 130 includes a content transformation component 250. The content transformation component 250, as illustrated in FIG. 2, includes a foreground identification module 252, a target identification module 254, and a content generation module 256. More or less components may be included in the content transformation component 250 without loss of generality. For example, two or more of the modules may be combined into a single module, or one of the modules may be divided into two or more modules. In one implementation, one or more of the modules may reside on different computing devices (e.g., different server computers, on a single client device, distributed among multiple client devices, etc.).

In one implementation, the foreground identification module 252 and the target identification module 254 may be utilized by the content transformation component 250 to identify relevant portions of one or more frames of a video stream. For example, the foreground identification module 252 may segment one or more frames of the video stream into a foreground and a background, for example, based on frame-to-frame comparison of the video images to determine object motion (e.g., using a structure-from-motion algorithm). In some implementations, the foreground identification module 252 may utilize one or more digital signal processing (DSP) chips to perform real-time image processing. The target identification module 254 may automatically identify targets/regions-of-interest (e.g., faces of video conference participants) within the foreground or background. Various algorithms/techniques may be utilized for identifying foregrounds and regions-of-interest of images, as would be appreciated by one of ordinary skill in the art.

In one implementation, the content generation module 256 may be utilized by the content transformation component 250 to generate a modified video stream using data generated by the foreground identification module and/or the target identification module 254. For example, the video stream and an image or video to be inserted into the video stream may be parsed into separate images based on the identified background and foreground of the video stream, and combined together to produce a modified video stream. In some implementations, the content generation module 256 may perform additional transformations (e.g., anti-aliasing to improve the quality of the modified video stream). In some implementations, the image or video may correspond to one of video/image items 280A-280Z, which may be retrieved from the data store 106. Each of video/image items 280A-280Z may include video/image data 282A-282Z, respectively, and associated metadata 284A-284Z, respectively.

In general, functions described in one implementation as being performed by any of the conference server 120 or the content processing server 130 can also be performed by one or more of the client devices 110A-110Z in other implementations if appropriate. For example, the client device 110A may implement a software application that performs the functions of the content transformation component 250. In addition, the functionality attributed to a particular component can be performed by different or multiple components operating together. In some implementations, the content processing server 130 can be accessed as a service provided to other systems or devices through appropriate application programming interfaces.

The conference platform 200 and the content transformation component 250 were described as being implemented by the conference server 120 and the content processing server 130, respectively, but may be implemented by any of the client devices 110A-110Z, the conference server 120, or the content processing server 130. As an example, a client device (e.g., client device 110A) may be programmed to perform some or all of the functions of the conference platform 200 and/or the content transformation component 250. As another example, the conference platform 200 and content transformation component 250 may be combined together in the conference server. In implementations in which the conference platform 200 and/or the content transformation component 250 are implemented on a client device, any functions described with respect to the conference platform 200 and/or the content transformation component 250 that "receive", "transmit", "retrieve", "identify", "determine", etc., are understood to refer to functions performed by sub-systems or sub-modules within the client device rather than across a network (e.g., the network 105), as would be appreciated by one of ordinary skill in the art.

Figure 3:
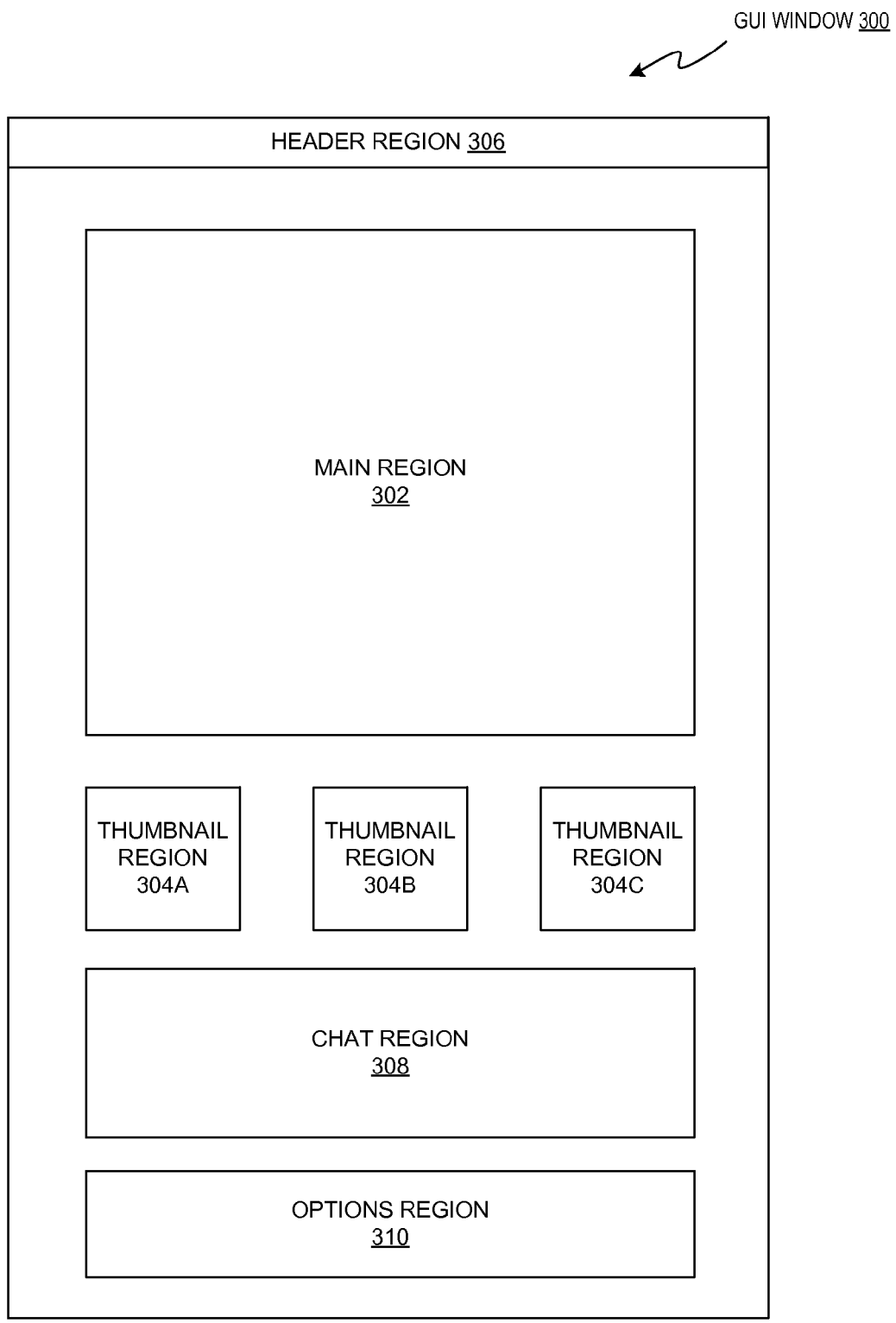
FIG. 3 is a diagram illustrating an exemplary graphical user interface window of a media collaboration service/application in accordance with an implementation of the disclosure.

FIG. 3 is a diagram illustrating an exemplary graphical user interface (GUI) window 300 of a media collaboration service/application in accordance with an implementation of the disclosure. In one implementation, the GUI window 300 includes a main region 302, thumbnail regions 304A-304C, a header region 306, a chat region 308, and an options region 310. In some implementations, less than all of thumbnail regions 304A-304C may be present in the GUI window 300, or additional thumbnail regions may be present. The GUI window 300 may be generated for display as a user interface in combination with a media viewer of a client device (e.g., the user interface 111A and the media viewer 112A of the client device 110A).

In some implementations, each region can contain, depict, or otherwise present media content (e.g., video content) provided by a particular participant in a media collaboration. For example, the main region 302 may contain a video stream transmitted by a first participant (e.g., a "room" of the first or primary participants in a videoconference, video clips shared by the first participant, etc.), while each of the thumbnail regions 304A-304C may contain a miniaturized version of video streams transmitted by one or more additional participants, static images (e.g., an avatar, etc.) associated with the additional participants, miniaturized versions of video streams associated with the additional participants, or combinations thereof. It should be noted that although the regions of the GUI window 300 are depicted as rectangular, one or more of the regions may have some other shape (e.g., a circle, a trapezoid, etc.). Moreover, the shape, size, and/or layout of the GUI window 300 may depend on the device on which the GUI window 300 is to be presented. For example, as illustrated in FIG. 3, the GUI window 300 is formatted in a way that is suitable for a mobile device.

In one implementation, each of the main region 302 and the thumbnail regions 304A-304C may be associated with video streams generated by respective client devices of one or more participants in the video collaboration (e.g., video conference participants). Moreover, in certain implementations a particular region can change (e.g., from a thumbnail region to a major region) or switch the video streams displayed in the different regions depending on whether the participant associated with the region is speaking or not (e.g., using the interface module 204). Such a change can be performed automatically (e.g., without receiving any user request or detecting any user interaction). In some implementations, the conference platform 200 may receive the video streams and identify (e.g., using the interface module 204) which video stream corresponds to a current speaker or a focus of attention in general (e.g., the video stream corresponds to a participant that is hosting the media collaboration, a volume level of a speaker, a host selection of a particular participant, etc.). In some implementations, a client device that implements the GUI window 300 may receive a composite content stream (e.g., that includes video/audio stream data generated by one or more of the client devices 110A-110Z) that was generated by the interface module 204 of the conference platform 200. The client device may be configured to extract content (e.g., one or more video/audio streams) from the composite content stream. In one implementation, the composite content stream includes metadata that specifies geometric properties corresponding to regions of the GUI window 300, such that video streams can be extracted from the composite content stream and mapped to the appropriate regions within the GUI window 300.

In one implementation, one of the thumbnail regions 304A-304C may transform or transition into the main region 302 (e.g., in response to a participant selecting/clicking on the thumbnail region or otherwise activating the thumbnail region), and vice versa. In some implementations, when a particular participant is speaking during a video conference, a video stream of the participant may be displayed within the main region 302. For example, if a video stream corresponding to a first participant is displayed in the main region 302 and the first participant is not speaking, a second participant's video stream may be "promoted" from one of the thumbnail regions 304A-304C to the main region 302 while the first participant's video stream is "demoted" to one of the thumbnail regions 304A-304C.

In one implementation, the composite content stream may include real-time chat data. For example, the chat data may be displayed within the chat region 308. The chat region 308 may provide a user/participant the opportunity input chat messages and transmit the chat messages (e.g., to the conference server 120, which routes the chat messages to client devices of other participants).

In one implementation, the options region 310 may provide selectable options to a user. For example, the selectable options may allow the user to adjust settings of the media collaboration (e.g., display features, volume, etc.), invite additional users to participate, apply transformations to a received/generated video stream, etc. Options related to content transformations are described in greater detail with respect to FIGS. 4-8.

FIG. 4 is a flow diagram illustrating a method 400 for performing user-triggered transformations of a video stream in a video conference according to an implementation of the disclosure. The method 400 may be performed by processing logic that includes hardware (e.g., circuitry, dedicated logic, programmable logic, microcode, etc.), software (e.g., instructions run on a processing device to perform hardware simulation), or a combination thereof. In one implementation, the method 400 may be performed by the content transformation component 250 as described with respect to FIGS. 1 and 2. In describing the method 400, reference is made to FIGS. 5-8 to illustrate various implementations. It is noted that the examples provided in FIGS. 5-8 are meant for illustrative purposes, and are not to be considered limiting implementations.

The operations of the method 400 may be performed for a media collaboration according to various implementations of a system architecture (e.g., the system architecture 100). In one implementation, content streams, such as video streams generated/captured by client devices (e.g., client devices 110A-110Z) may be transmitted to a conference server (e.g., the conference platform 200 of the conference server 120), and then transmitted to a content processing server (e.g., the content transformation component 250 of the content processing server 130). One or more of the content streams are transformed by the content processing server and transmitted (e.g., as a composite content stream) to the client devices. In another implementation, the content streams are transmitted to the content processing server, and one or more of the content streams are transformed, transmitted to the conference server, and then transmitted to the client devices (e.g., as a composite content stream). In another implementation, a content stream is generated/captured by a first client device (e.g., the client device 110A), transformed at the client device (e.g., by implementing the content transformation component 250 locally on the client device 110A), and transmitted to the conference server 120 or directly to one or more additional client devices participating in the media collaboration. In another implementation, an indication to transform a video stream may be transmitted from a first client device to a second client device, in which the transformation of the video stream is performed by the second client device (e.g., the second client device implements the content transformation component 250).

Referring to FIG. 4, method 400 begins at block 410 when a selection of a video or image is received from a first participant of a video conference. For example, the first participant may select the video or image via a user interface of a client device (e.g., user interface 111A of the client device 110A). In one implementation, the selection may be transmitted by the client device to a content processing server (e.g., content processing server 130).

In one implementation, the user interface (or media collaboration interface) may correspond to GUI window 500, as illustrated in FIG. 5. The GUI window 500 includes a main region 502 that may display a video stream of the first participant. Thumbnails 504, 506, 508 may include video streams of additional participants in the video conference (e.g., a second participant associated with the thumbnail 504, and a third participant associated with the thumbnail 506). In one implementation, a thumbnail version of the video stream of the main region 502 is displayed as a thumbnail (e.g., as the thumbnail 508). In some implementations, the GUI window 500 may include a chat window (e.g., chat region 308 as illustrated in FIG. 3). The GUI window 500 includes an options region 510 that includes selectable options for performing a content transformation. For example, the content transformation may include inserting a video or image into one or more video streams during a video conference to provide a comical effect referred to as a "photobomb". The options region 510 includes an image/video list 512 from which the first participant may select an image or video. For example, the image/video list 512 may include one or more of a video or image of a celebrity, a video or image of an animal, a video or image of a cartoon character, or other videos or images. As illustrated, the first participant has selected "martial artist" from the list, which may correspond to a video clip of a notable martial artist. The GUI window may also include a participant list 516 that lists each of the participants in the video conference. In one implementation, the first participant may select one or more participants (including the first participant who corresponds to "myself"). As illustrated, the first participant has selected checkbox 518, which indicates that he/she wishes to transform his/her video stream to include the "martial artist" selected in the image/video list 512. In some implementations, less than all of the options may be present in the options region 510, or additional options may be present in the options region 510.

Referring back to FIG. 4, at block 420, a request to modify a video stream is received from the first participant of the video conference. In one implementation, the request is received at the client device and transmitted to a content transformation component (e.g., the content transformation component 250) of the content processing server. In one implementation, the request may be received by the client device in the form of a selection of a selectable option by the first participant (e.g., selection of photobomb button 520). In some implementations, the first participant may select an image or video from the image/video list 512 and "drag" the selected image or video to a region of the GUI window 500 displaying one of the video streams (which may be interpreted by the content transformation component 250 as a request to modify the video stream). For example, the first participant may drag an indicator of the "martial artist" to his/her video stream displayed in the main region 502. In other implementations, different methods may be used for receiving the selection of the video or image and the request to modify the one or more video streams (e.g., voice activation, a topic extracted from spoken or textual conversation, etc.).

Figure 6B:
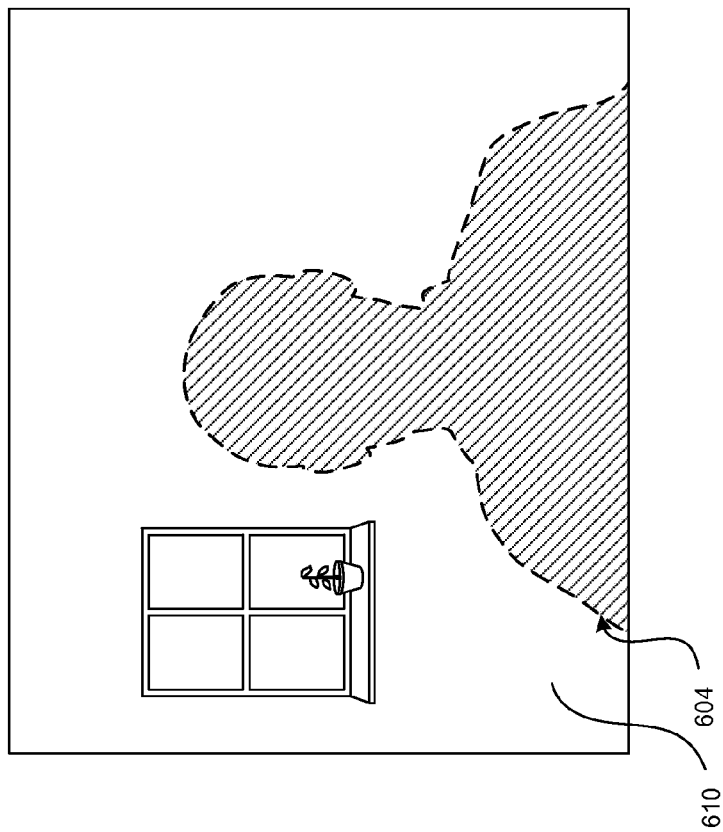
FIG. 6B is a diagram illustrating a background identified in a video stream in accordance with an implementation of the disclosure.
Figure 6A:
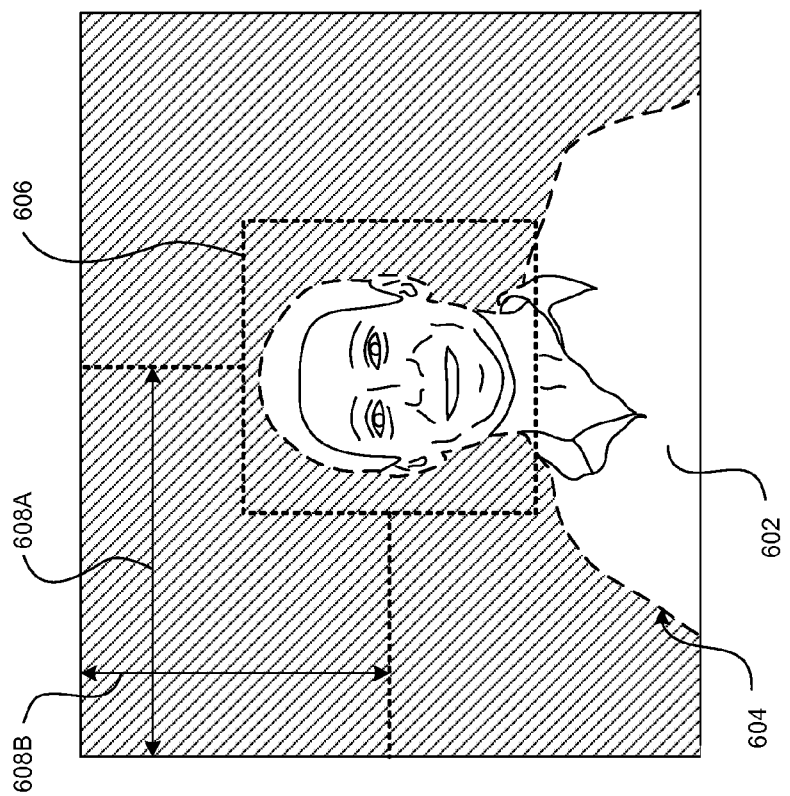
FIG. 6A is a diagram illustrating a foreground identified in a video stream in accordance with an implementation of the disclosure.

At block 430, a foreground and a background are identified within the video stream. In some implementations, if the video stream is a live video stream, block 430 is performed for each frame of the live video stream. In some implementations, block 430 is performed by the foreground identification module 252. As illustrated in FIG. 6A, a foreground 602 of the video stream is identified and may defined by a boundary 604 that segments one or more frames of the video. As illustrated in FIG. 6B, a background 610 may correspond to a remaining portion of the video stream that is outside of the boundary 604. In one implementation, a target detection algorithm (e.g., a facial recognition algorithm) may be used by the target identification module 254 to identify a target region 606 within the foreground 602. For example, the target region 606 may correspond to a face (e.g., a face of the first participant). A relative location of the foreground 602 (e.g., a target corresponding to the target region 606) may be defined based on positions 608A and 608B of the target region 606 within a video frame. In some implementations, the target (e.g., face) may be tracked, such that the positions 608A and 608B may vary from frame to frame of the video stream.

Figure 7B:
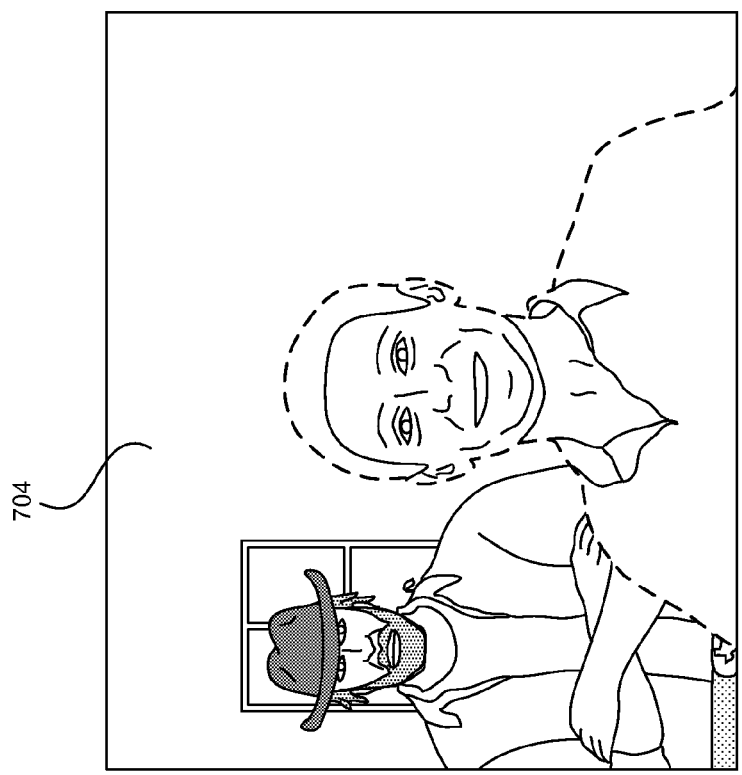
FIG. 7B is a diagram illustrating a transformation combining a foreground of a video stream with a modified background in accordance with an implementation of the disclosure.
Figure 7A:
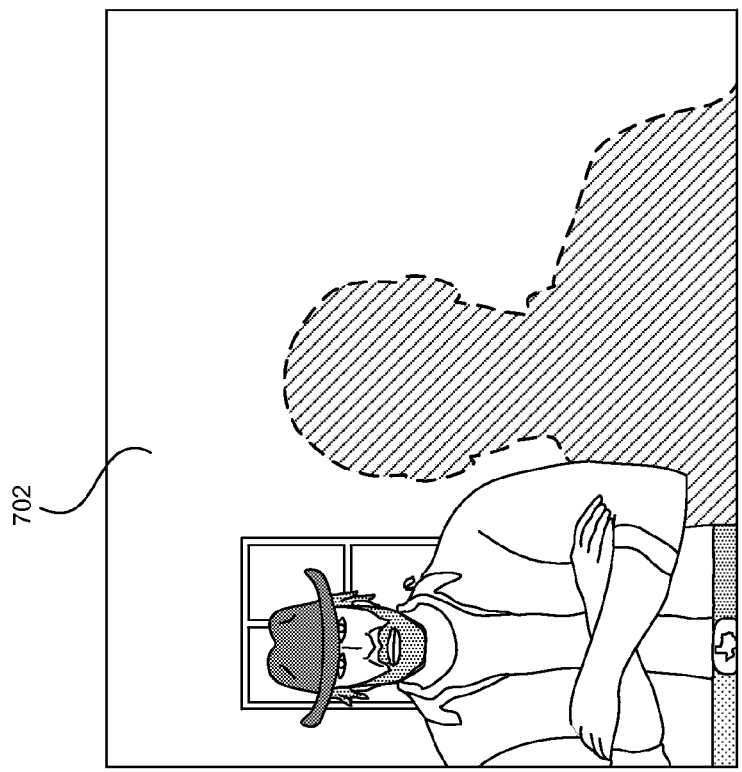
FIG. 7A is a diagram illustrating a transformation applied to a background of a video stream in accordance with an implementation of the disclosure.

Referring back to FIG. 4, at block 440, a modified video stream that includes the video or image inserted into the background is generated such that the video or image, when displayed, appears behind the foreground. In one implementation, a transformation is applied to the video stream by the content generation module 256 to produce the modified video stream. As illustrated in FIG. 7A, a video frame corresponding to the selected "martial artist" is overlaid/superimposed onto the background 610 of FIG. 6B to produce a modified background 702. As illustrated in FIG. 7, the foreground 602 of FIG. 6A is then overlaid onto the modified background 702 to produce a modified video frame 704. In some implementations, each video frame of the video stream is transformed, resulting in a modified video stream.

Figures 8A, 8B:
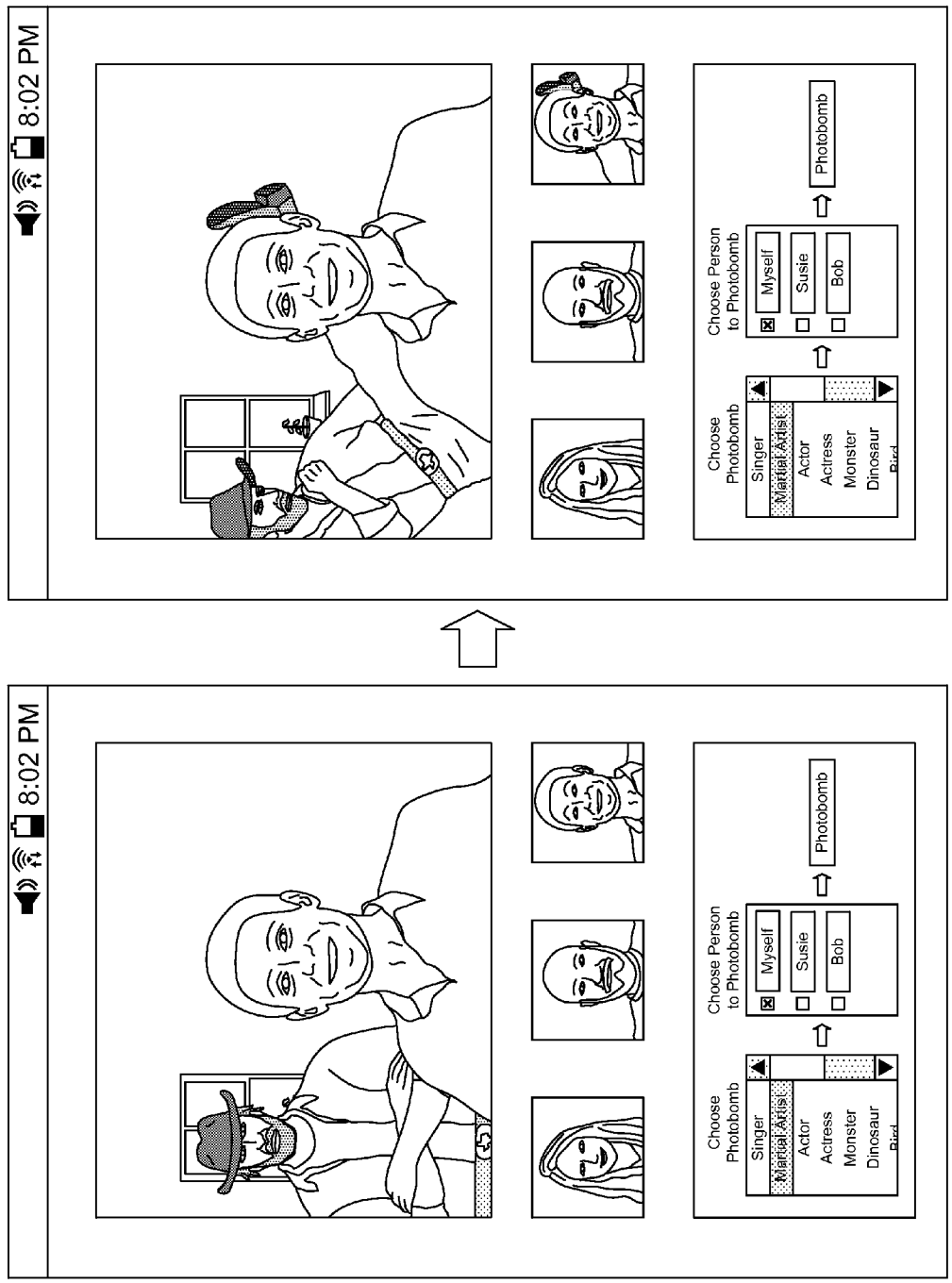
FIG. 8A is a diagram illustrating transformation of a video stream during a video conference in accordance with an implementation of the disclosure.
FIG. 8B is a diagram illustrating transformation of a video stream during a video conference in accordance with an implementation of the disclosure.

In some implementations, the transformation may be applied for a time duration (e.g., a pre-determined time duration of 5 seconds, 10 seconds, 30 seconds, etc.). In some implementations, if the video stream is to be modified to include an image (e.g., a static image) in the background, each frame of the video stream may be modified to include the static image for the time duration. In some implementations, if a video stream is to be modified to include a video in the background, each frame of the video stream may be modified to include an appropriate frame of the video (e.g., frame N of the video stream is modified to include frame M of the video, frame N+1 of the video stream is modified to include frame M+1 of the video, etc.). FIGS. 8A and 8B, respectively, represent modified frames of the video stream associated with the first participant after applying the transformation, which may be appear within respective GUI windows of one or more client devices of the additional participants when the modified video stream has been transmitted to the client devices, in accordance with block 450. For example, FIGS. 8A and 8B correspond to the video stream of the first participant of video conference that has been transformed to create the illusion of a martial artist entering the room of the first participant and delivering a powerful roundhouse kick to the back of the first participant's head. In applying the transformation, the content transformation component 250 may have accounted for a target region of the video stream (e.g., target region 606) in order to insert the video of the martial artist into the video stream at an appropriate location (e.g., by translating the video frames of the martial artist) such that a pre-defined region of the video corresponding to the martial artist's boot is located directly behind the first participant's head.

Figure 8D:
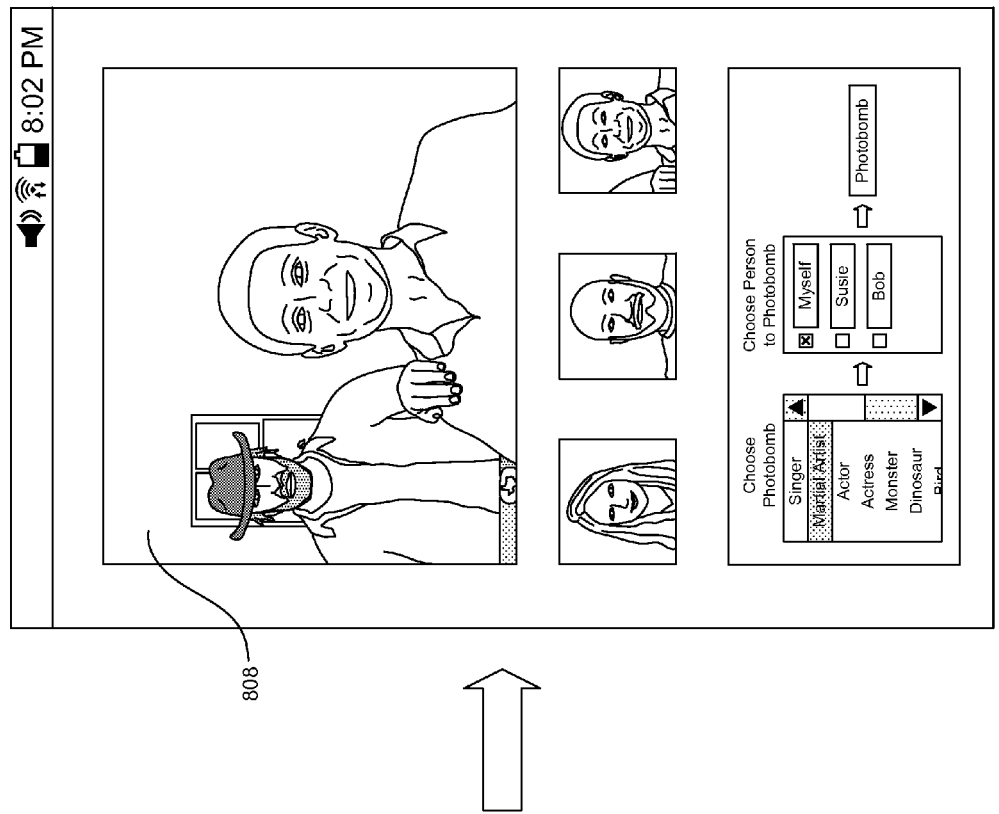
FIG. 8D is a diagram illustrating transformation of a video stream during a video conference in accordance with an implementation of the disclosure.
Figure 8C:
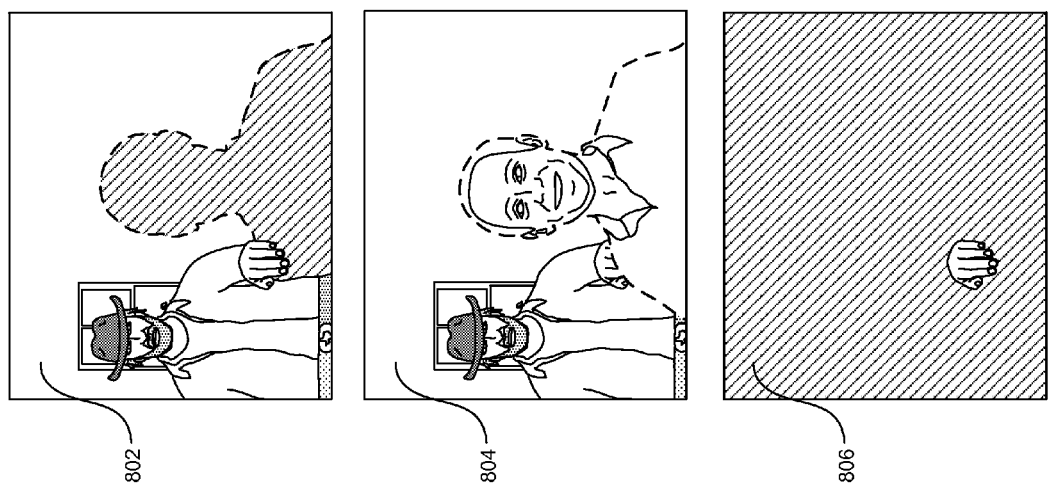
FIG. 8C is a diagram illustrating transformation of a video stream during a video conference in accordance with an implementation of the disclosure.

In one implementation, additional transformations may be applied to the video stream. For example, as illustrated in FIG. 8C, a modified background 802 is generated in a similar manner as described with respect to FIG. 7A, and a foreground of the video stream may be overlaid onto the modified background 802 to produce a first modified video frame 804, as described with respect to FIG. 7B. Additionally, the first modified video frame portion 806 of the video (e.g., corresponding to a hand) may also be overlaid over the first modified video frame 804 to produce a second modified video frame 808, as illustrated in FIG. 8D. Thus, the transformation may include a portion of an image or video that appears behind the foreground of the video stream and a portion of the image or video that appears in front of the foreground. In some implementations, a target region of the video stream may be taken into account in determining a position to insert the image or video (e.g., to position the video of the martial artist so that his hand appears on the shoulder of the first participant).

For simplicity of explanation, the various implementations of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the implementations of the methods disclosed in this specification are capable of being stored on an article of manufacture to facilitate transporting and transferring such methods to computing devices. The term "article of manufacture", as used herein, is intended to encompass a computer program accessible from any computer-readable device or storage media.

Figure 9:
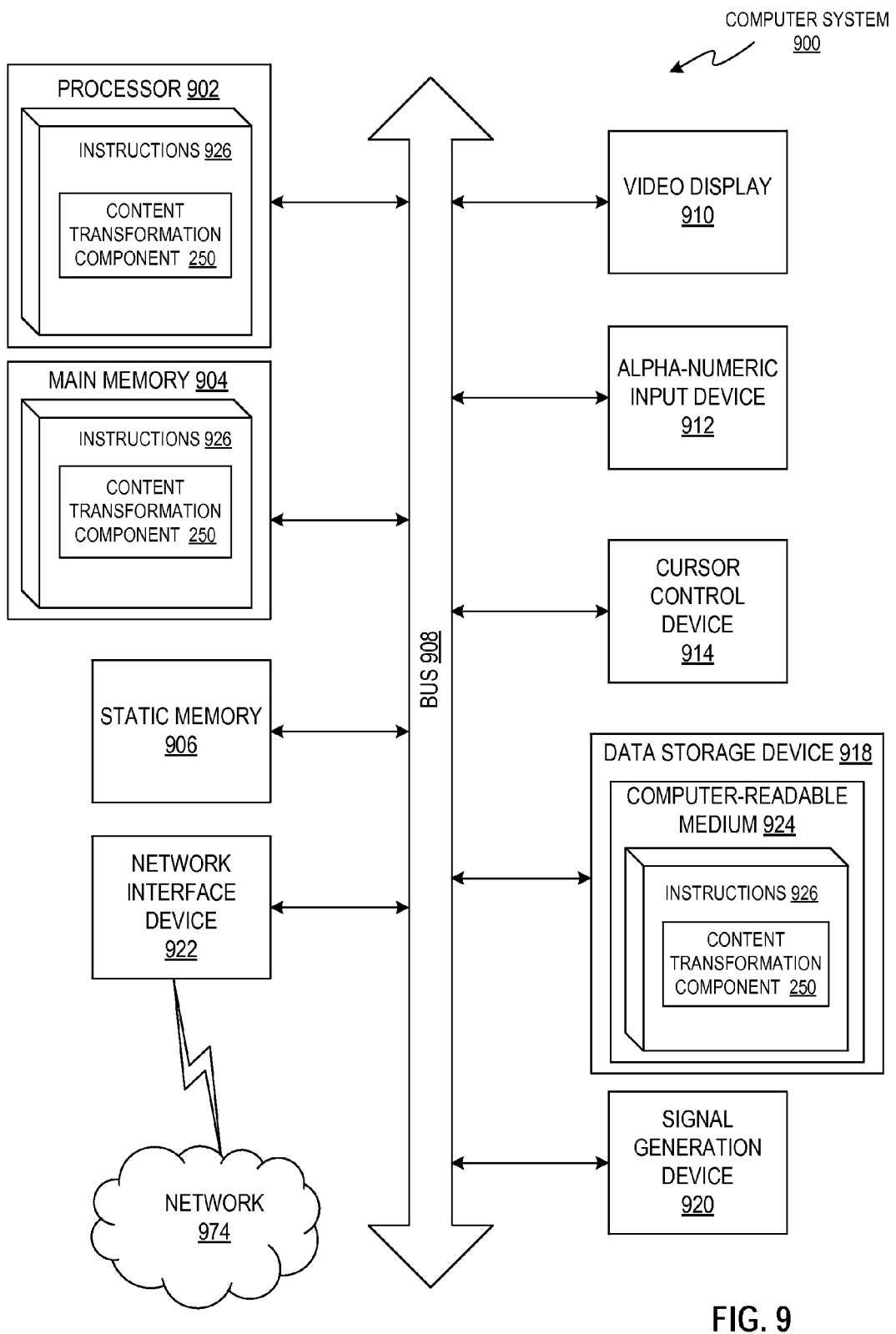
FIG. 9 is a block diagram illustrating an exemplary computer system in accordance with an implementation of the disclosure.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 900 may be utilized by or illustrative of one or more of the client devices 110A-110Z, the data store 106, the conference server 120, or the content processing server 130.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a DSP, network processor, or the like. The processor 902 is configured to execute instructions 926 for performing the operations and steps discussed herein.

The computer system 900 may further include a network interface device 922. The computer system 900 also may include a video display unit 910 (e.g., a liquid crystal display (LCD), a cathode ray tube (CRT), or a touch screen), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 902 during execution thereof by the computer system 900, the main memory 904 and the processor 902 also constituting computer-readable storage media. The instructions 926 may further be transmitted or received over a network 974 (e.g., the network 105) via the network interface device 922.

In one implementation, the instructions 926 include instructions for one or more content transformation components 250, which may correspond to the identically-named counterpart described with respect to FIGS. 1 and 2. While the computer-readable storage medium 924 is shown in an exemplary implementation to be a single medium, the terms "computer-readable storage medium" or "machine-readable storage medium" should be taken to include a single medium or multiple media (e.g., a centralized or distributed database, and/or associated caches and servers) that store the one or more sets of instructions. The terms "computer-readable storage medium" or "machine-readable storage medium" shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the description, discussions utilizing terms such as "receiving", "transmitting", "generating", "adding", "subtracting", "inserting", "removing", "analyzing", "determining", "enabling", "identifying", "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus, device, or system for performing the operations herein. This apparatus, device, or system may be specially constructed for the required purposes, or it may include a general purpose computer selectively activated or reconfigured by a computer program stored in the computer. Such a computer program may be stored in a computer- or machine-readable storage medium, such as, but not limited to, any type of disk including floppy disks, optical disks, compact disk read-only memories (CD-ROMs), and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation. Moreover, it is noted that the "A-Z" notation used in reference to certain elements of the drawings is not intended to be limiting to a particular number of elements. Thus, "A-Z" is to be construed as having one or more of the element present in a particular implementation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, a request from a first participant of a video conference to modify a video stream;
   identifying, by the processing device, a foreground and a background within the video stream; and
   generating, by the processing device, a modified video stream comprising a video or image inserted into the background, wherein the video or image, when displayed, appears behind the foreground.

2. The method of claim 1, further comprising:
   identifying a relative location of the foreground within a frame of the video, wherein generating the modified video stream further comprises inserting the video or image into the background based on the identified relative location.

3. The method of claim 1, wherein the video stream is captured by a first client device of the first participant of the video conference, and wherein the processing device is part of a server that is supporting the video conference, the method further comprising:
   receiving, by the processing device, the video stream prior to receiving the request to modify the video stream.

4. The method of claim 3, further comprising:
   transmitting, by the processing device, the modified video stream to one or more client devices of additional participants of the video conference.

5. The method of claim 1, further comprising:
   receiving a selection of the video or image from the first participant of the video conference.

6. The method of claim 1, wherein the foreground corresponds to a face of the first participant.

7. The method of claim 1, wherein the video or image is to appear behind the foreground of the modified video stream for a pre-determined time duration.

8. The method of claim 1, wherein the video or image is any one of a video or image of a celebrity, a video or image of an animal, or a video or image of a cartoon character.

9. A system comprising:
   a memory; and
   a processing device communicatively coupled to the memory, wherein the processing device is to:
   receive a request from a first participant of a video conference to modify a video stream;
   identify a foreground and a background within the video stream; and
   generate a modified video stream comprising a video or image inserted into the background, wherein the video or image, when displayed, appears behind the foreground.

10. The system of claim 9, wherein the processing device is further to:
    identify a relative location of the foreground within a frame of the video; and
    insert the video or image into the background based on the identified relative location.

11. The system of claim 9, wherein the video stream is captured by a first client device of the first participant of the video conference, and wherein the processing device is part of a server that is supporting the video conference, wherein the processing device is further to:
    receive the video stream prior to receiving the request to modify the video stream.

12. The system of claim 11, wherein the processing device is further to:
    transmit the modified video stream to one or more client devices of additional participants of the video conference.

13. The system of claim 9, wherein the processing device is further to:
    receive a selection of the video or image from the first participant of the video conference.

14. The system of claim 9, wherein the foreground corresponds to a face of the first participant.

15. The system of claim 9, wherein the video or image is to appear behind the foreground of the modified video stream for a pre-determined time duration.

16. The system of claim 9, wherein the video or image is any one of a video or image of a celebrity, a video or image of an animal, or a video or image of a cartoon character.

17. A non-transitory computer-readable storage medium having instructions stored thereon that, when executed by a processing device, cause the processing device to perform operations comprising:

receiving a request from a first participant of a video conference to modify a video stream;

identifying a foreground and a background within the video stream; and generating a modified video stream comprising a video or image inserted into the background, wherein the video or image, when displayed, appears behind the foreground.

18. The non-transitory computer-readable storage medium of claim 17, wherein the operations further comprise:

identifying a relative location of the foreground within a frame of the video, wherein generating the modified video stream further comprises inserting the video or image into the background based on the identified relative location.

19. The non-transitory computer-readable storage medium of claim 17, wherein the video stream is captured by a first client device of the first participant of the video conference, and wherein the processing device is part of a server that is supporting the video conference, wherein the operations further comprise:

receiving, by the processing device, the video stream prior to receiving the request to modify the video stream.

20. The non-transitory computer-readable storage medium of claim 17, wherein the operations further comprise:

receiving a selection of the video or image from the first participant of the video conference.

* * * * *